United States Patent [19]

Miller

[11] Patent Number: 4,609,145

[45] Date of Patent: Sep. 2, 1986

[54] PESTICIDE SPRAYING APPARATUS

[76] Inventor: Allen L. Miller, 619 Congress Ct., Delaware, Ohio 43015

[21] Appl. No.: 669,612

[22] Filed: Nov. 8, 1984

[51] Int. Cl.⁴ .......................... B05B 9/06; B05B 1/20; B05B 3/10; A01G 25/09

[52] U.S. Cl. ..................................... 239/77; 239/159; 239/172; 239/223

[58] Field of Search ................. 239/77, 159, 172, 223, 239/224

[56] References Cited

U.S. PATENT DOCUMENTS

| 3,421,697 | 1/1969 | Marks | 239/224 |
| 4,225,084 | 9/1980 | Bals | 239/223 |
| 4,337,895 | 7/1982 | Gallen | 239/223 X |

FOREIGN PATENT DOCUMENTS 661254 11/1951 United Kingdom ................. 239/77

OTHER PUBLICATIONS

The brochure entitled "Ground Plane Plus", distributed by the Sprayrite Mfg. Co., of West Helena, AR.

Primary Examiner—Joseph F. Peters, Jr.
Assistant Examiner—Patrick N. Burkhart
Attorney, Agent, or Firm—Emch, Schaffer, Schaub & Porcello Co.

[57] ABSTRACT

An improved pesticide spray apparatus is disclosed which incorporates an independently controlled chemical delivery system with an independently controlled air delivery system for increased pesticide application efficacy. The air delivery system includes a blower unit which is aerodynamically efficient and a unique protective shroud system which prevents the undesirable corrosion of the electrical and hydraulic components of the spray system.

18 Claims, 6 Drawing Figures

PESTICIDE SPRAYING APPARATUS

BACKGROUND OF THE INVENTION

The present invention relates to an improved pesticide spraying apparatus for use in the application of agricultural pesticides. This improved apparatus utilizes a rotary atomizer, such as the atomizer described in U.S. Pat. No. 4,225,084, as a pesticide droplet discharge unit.

The most common method of applying agricultural pesticides necessitates the use of large volumes of water as a carrier for the chemical. However, many problems have been encountered which have caused the agricultural industry to look for alternative methods of application. One of the major problems in the use of water as a carrier is that 20–30 gallons of water per application acre is required to achieve acceptable coverage. The need for such large volumes creates hardships due to the containment and transfer operations needed to replenish the sprayer holding tanks with the appropriate chemical mix. In some instances, the operator must discontinue spraying operations every few acres to replenish his tanks. Further, most commonly used pesticides available on today's market are not water soluble, but rather are oil-based. These oil-based pesticides require additives which allow the pesticide to properly mix with the water. Without the additives, the water and oil pesticide mixture sometimes forms an inversion during agitation; an undesirable condition. Problems have also been encountered in environments that are hot, dry and windy as the water carrier may evaporate entirely within seconds after application, thereby not allowing the pesticide chemical to be effectively absorbed.

The rotary atomizer technology, such as that disclosed in U.S. Pat. No. 4,225,084, has made available a pesticide applicator which is capable of more closely regulating the volume of chemical used and thereby regulating the chemical cost to the farmers. The rotary atomizer unit provides for an ultra low volume, controlled droplet discharge which greatly enhances reduced chemical application rates and provides for improved pest control. Such atomizers have been found to be acceptable applicators for a non-water approach to pesticide application. The use of the rotary atomizer promotes uniform droplet size and improves droplet density to increase the effectiveness of the chemical pesticide treatment as compared to other conventional application methods. Further, the low volume design of the atomizer cup produces acceptable results from both direct rate application and oil-based rate application, as an alternative to water based application.

As long as a sufficient number of droplets of acceptable size can be generated by the rotary atomizer, there is no need for a carrier. If a larger volume of droplets is necessary, a compatible oil carrier can be used. The use of vegetable oil as a replacement for water as a carrier has solved several problems. Vegetable oil eliminates alkaline hydrolysis wherein the salts in the water neutralize the acid in the pesticide. Vegetable oil improves the efficacy of the pesticide chemical since it is biologically active and can be absorbed or digested by the plant or insect being treated. Vegetable oil greatly reduces the rates of chemical volatility and the photodecomposition of some pesticide chemicals. Also, vegetable oil resists washoff and spreads out to provide a more even application.

Certain current models of the rotary atomizer type applicator use small DC motors to drive the atomizers. Early versions of the DC motor drive systems encountered problems in reliability because pesticide chemicals being applied were highly corrosive to the atomizer unit and its drive systems. As the drive system corrodes, power to the motors was frequently interrupted causing an inordinate amount of service and down time. Further, the commonly used DC electric motors are operable only at a limited range of speeds; for example four distinctly different speeds. The limited speed settings can cause incorrect application rates. For instance, if the atomizer is set at too high a speed for wind conditions at the time of application, the droplets will be quite fine and will drift from the target area. However, if the speed of the atomizer is reduced to eliminate the drift of the pesticide, the large droplet size which can result from the limitations on speed variations will result in wasted chemicals and will not provide adequate coverage.

In an attempt to correct these shortcomings, some rotary atomizers have been designed which use individual hydraulic drive motors. The use of hydraulic motors has provided for a greater variation in speed settings as the hydraulic motors are controlled by manually adjusting their hydraulic flow. This approach has encountered significant problems in that the hydraulic motors consume large volumes of high pressure oil; more oil than most small and medium size prime movers can provide without the addition of an auxiliary hydraulic system. Further, since the motors are directly coupled to the atomizer cup, they must rotate at (whatever cup) speed is needed by the cup to adequately disperse the pesticide chemical. These cup speeds can approach 6,000 revolutions per minute in some applications. Such high speeds can create foaming in the hydraulic oil as well as overheat the oil. The hydraulic oil often reaches temperatures near or above design limits. In order to reduce the overheating problems, auxiliary cooling systems have been required on all but the largest tractors which usually have such systems as standard equipment. These cooling systems prevent the breakdown of the hydraulic oil and, thereby, increase the life of all components which are lubricated by the hydraulic system. Even with large tractors and ideal hydraulic systems, however, the individual hydraulic motors are known to wear at uneven rates after only a few weeks of use. Long before the service life of the motor is over, measurable differences between atomizer speeds will result in uneven application rates.

Other attempts to improve the efficacy of the rotary atomizer include the use of small fans attached to the shaft at the bottom of the atomizer. These fans are intended to help direct the pesticide spray. The fans can be manually adjusted to provide a variable pitch to increase and decrease air delivery speeds. They rotate at the same speed as the rotary atomizer and there are many limitations in their ability to deliver desirable volumes of air. The fans are able to increase or decrease air velocity at a given RPM only by adjusting the pitch of the blades. However, this adjustment must be manually made to each individual blade; a frustrating and time-consuming chore.

Application environments that need varying degrees of large droplets and large volumes of air or small droplets and small volumes of air cannot be adequately treated without many time-consuming manual adjustments being made to the spray system by the operator. The operator has to leave the tractor platform and adjust each unit whenever change is required. Thus, when working in small fields where crop conditions often change, the continual readjustment process can easily consume large quentities of an operator's time.

Therefore, it is the purpose of the present invention to provide an improved pesticide spraying apparatus capable of an infinite variety of adjustable speeds at the rotary atomizer and further being capable of an infinite variety of independently adjustable speeds of a fan blower to assist in dispersion of the pesticide chemical.

SUMMARY OF THE INVENTION

The improved pesticide spray apparatus of the present invention is designed to be mounted on a conventional spray boom. The spray unit consists of three integrated component systems which independently provide air delivery, droplet generation, and pesticide flow controls. The air delivery system of the present invention employs a blower which includes a fan and a tubular housing. The tubular housing directs the air driven downward by the fan to assist in the dispersion of the pesticide chemical leaving the rotary atomizer. The shape of the tubular housing varies from a circular opening at the top of the tubular housing to an oval opening at the bottom of the tubular housing. The oval shape flattens and widens the discharge pattern to provide overlap between the individual sprayer units.

The fan member is mounted on a gearbox which is fixed to the top of a conventional spray boom. The gearbox is driven by a hydraulic motor which also is mounted on the spray boom. The present invention provides for a plurality of spraying units to be positioned on a spray boom and the single hydraulic motor is designed to drive all of the gearboxes of all the spraying units. The gearbox is designed to provide a gear ratio which causes the fan member to rotate at twice the speed of the driveshafts which connect the gearboxes to the motor, thus allowing the driveshafts to be driven by a conventional gear type hydraulic motor without fear of foaming the hydraulic fluid or overheating the fluid. Conventional gear hydraulic motors have proven to be very efficient, generating little heat during their operation and requiring little servicing during a long life.

The hydraulic motors are controlled by a flow control valve remotely actuated by a linear actuator. The actuator control is mounted on the operator platform or in the cab of the tractor, truck, or prime mover carrying the spray boom. Air volume delivery from the fans can thus be regulated independently of the atomizer speed with an infinite variety of speeds without necessitating shutdown of the spraying system or requiring the operator to dismount from his station.

The present invention further provides for a unique aerodynamic tubular housing which prevents unnecessary turbulence in the air column being delivered past the rotary atomizer. A boom shroud designed to cover the boom member, the driveshafts and the pesticide anti-siphon valves traverses the interior of the tubular housing. A center shroud designed to cover the gearbox and the electric motor is integrally engaged with the boom shroud along the centerline of the housing. The shrouds are designed to have generally elliptical shape to provide the smoothest possible flow of air over their surfaces. The tubular housing is designed to provide for a constant flow rate for the air column passing through the housing and over the shrouds. Thus, the shape of the tubular housing continuously varies depending on the interior volume enclosed by the shrouds. This adjustment eliminates constrictions and expansions in the air column as it flows through the housing. This eliminates undesirable pressure changes in the air column, thus minimizing undesirable turbulence.

The second major component of the present invention utilizes a rotary atomizer, such as the Micron DR-4 assembly. The rotary atomizer is driven by a DC electric motor with field control. It is capable of an infinite variety of speeds from 0-6500 RPM. The motor of the rotary atomizer is mounted on the underside of the spray boom and the atomizer is mounted on the shaft of the motor. The motor control is mounted on the operator's platform. Since the atomizer speed is the same as the motor speed, droplet density can be changed quickly without shutdown of the spraying system.

It can be seen that the independently controlled variable speed blower and the independently controlled variable speed rotary atomizer can provide for any combination of high or low volume air coupled with high or low droplet density. This capability allows the operator to truly manage the pesticide application process and tailor that process to field conditions on a real time basis.

The last component of the present invention provides for control of the flow of the pesticide chemical to the atomizer cup. Uniform droplet generation of the desired size is possible only if the rate of chemical flow remains constant. The reduced flow requirements of a pesticide chemical being applied without the usual water carrier means that only a few ounces of pesticide chemical are needed every minute at the atomizer cup. This reduced flow requirement makes the handling of wettable powders more difficult, since powders require constant agitation to avoid settling. For this reason, the feed system of the present invention is designed to recirculate in a closed loop. The pesticide supply line passes an anti-siphon assembly which rations the pesticide to each atomizer cup and then returns excess pesticide chemical to the suction side of the chemical feed pump. The chemical flow from the feed pump is regulated by an operator controlled solenoid valve.

Thus, it can be seen that the present invention provides the benefit of independent and variable air delivery to assist in dispersing the chemical droplets to match target conditions and offset the effects of uncontrollable elements, thereby providing superior coverage.

The present invention further provides the major benefit of independently controlled variable droplet generation wherein the droplet density is adjusted to match the pesticide application rate with changing environmental conditions.

The present invention provides for increased ease of adjustment to the air delivery system and droplet generation system in that those adjustments can be made while the systems are in operation with a minimum of delay.

The present invention also provides for improved electrical and hydraulic systems which reduce hydraulic and electric demands on the prime mover to offer greater versatility and reduced support requirements and costs.

Finally, the improved apparatus provides for shielded components through the use of the center shroud, boom shroud, and tubular housing thereby effecting less maintenance and cleaning costs and providing better protection for the operator.

DETAILED DESCRIPTION OF THE PREFERRED EMBODIMENT

The present invention relates an improved pesticide spray apparatus designed to increase the efficacy of pesticide spray dispersion from rotary atomizer units by directly and independently controlling three integrated component systems; the air delivery, the droplet generation, and the pesticide flow control.

Figure 1:
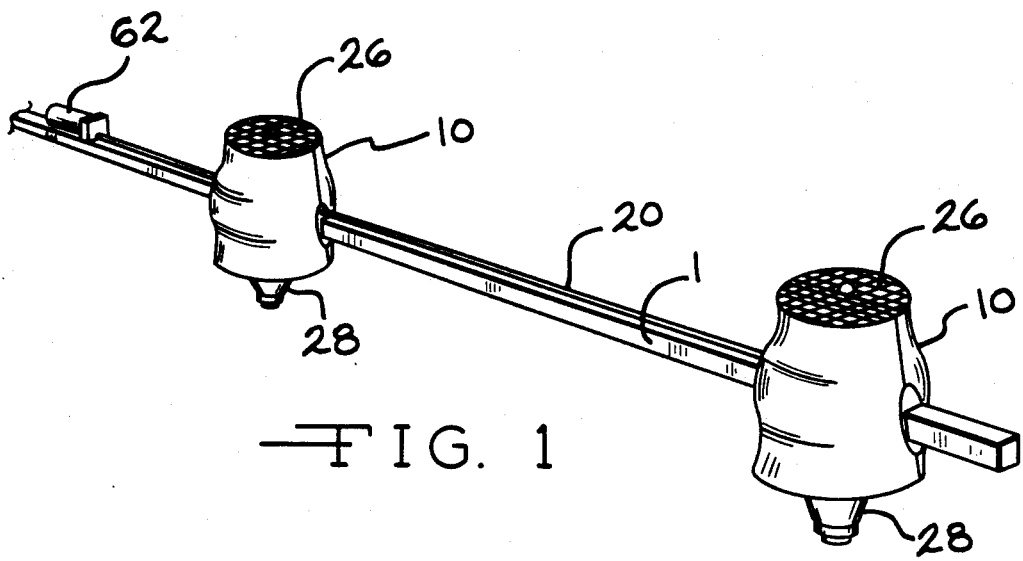
FIG. 1 is a perspective view showing two units of the improved pesticide spray apparatus mounted on a conventional spray boom.
Figure 2:
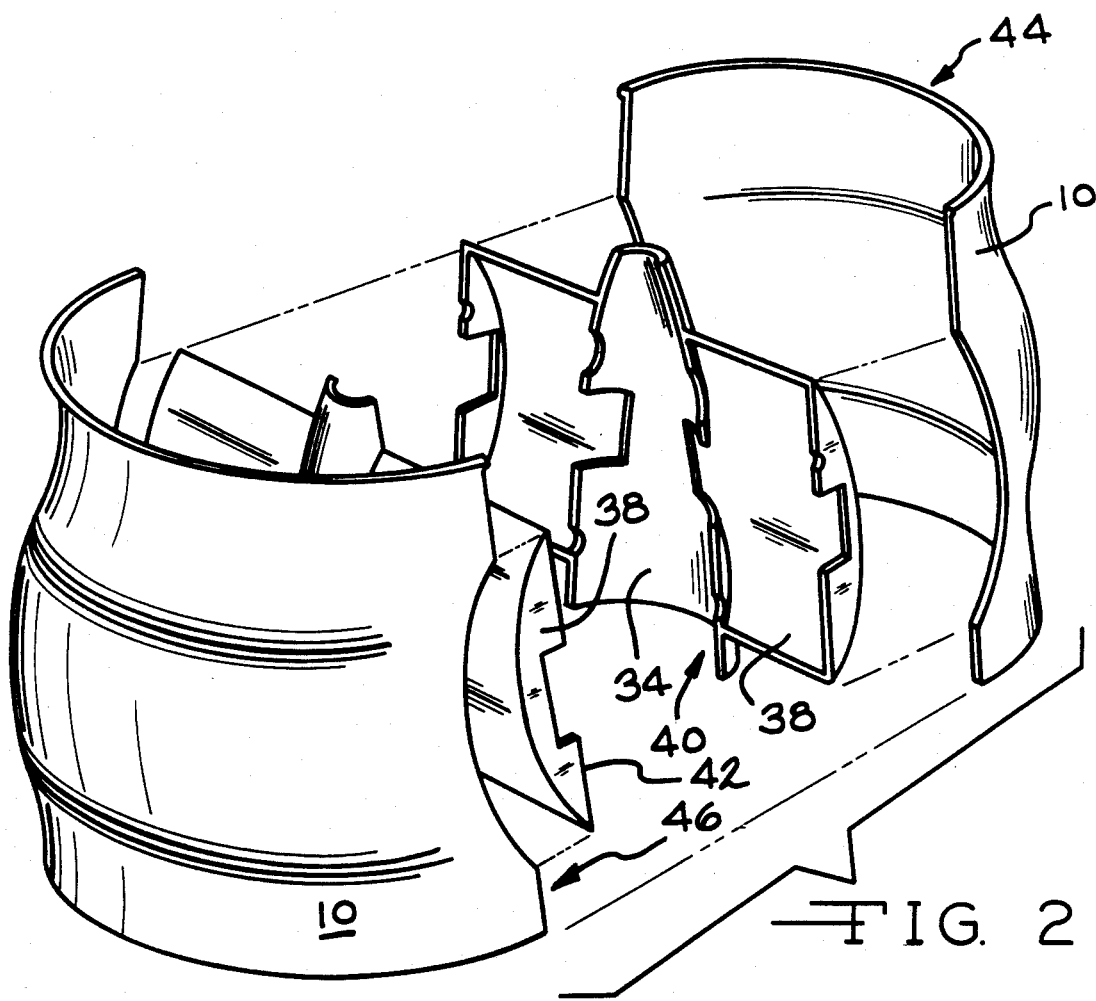
FIG. 2 is a perspective view showing the two halves of the center shroud, boom shroud and tubular housing of the pesticide spray apparatus of the present invention.
Figure 3:
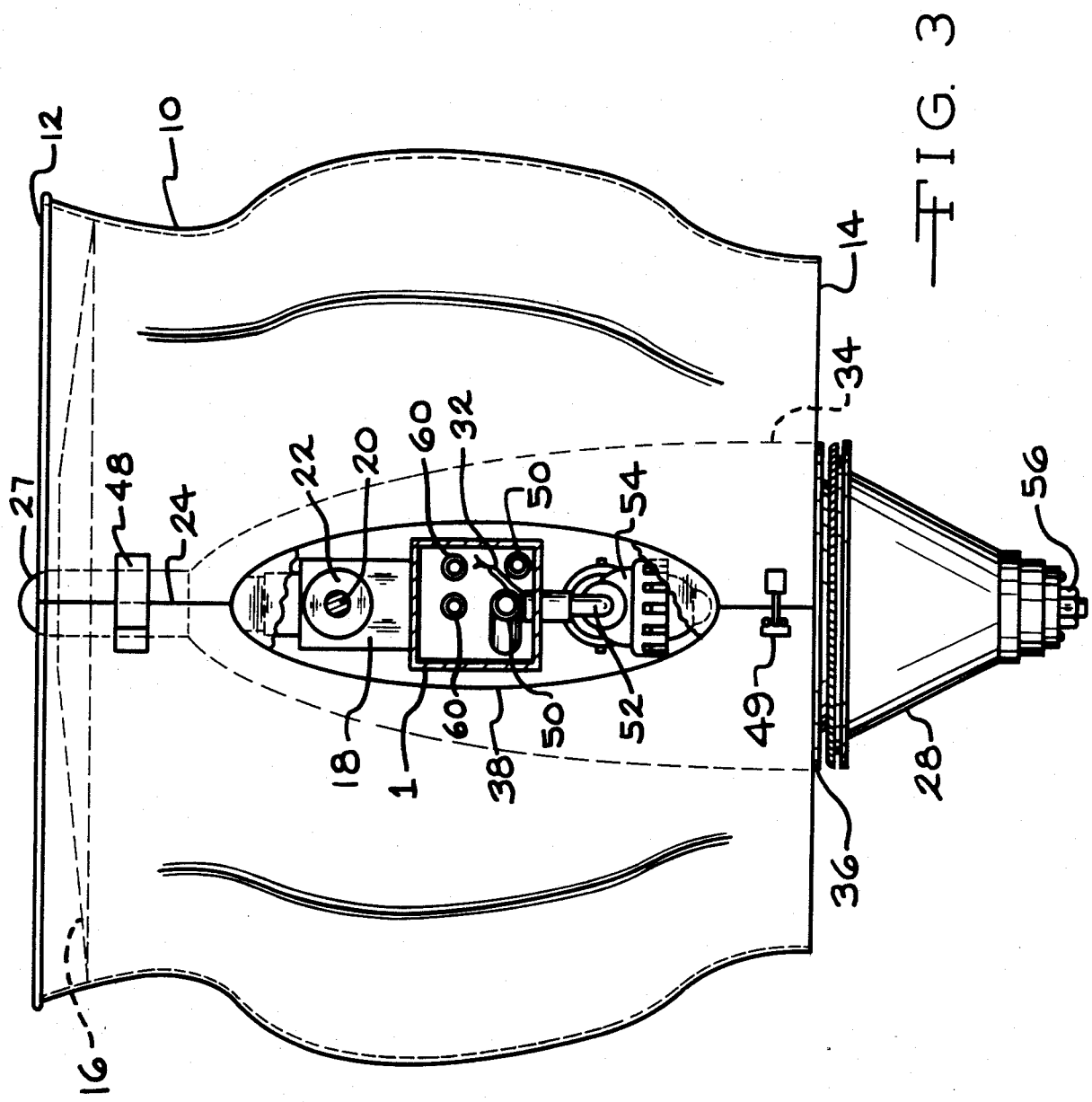
FIG. 3 is a side view of the pesticide spray apparatus of the present invention with a center cutout showing the boom, gearbox, and anti-siphon apparatus.

Referring to FIGS. 1, 2 and 3, the air delivery system is shown to comprise a blower which has a tubular housing 10 which is mounted on a conventional spray boom 1. In the preferred embodiment the tubular housing is approximately 12 inches long. The shape of the tubular housing 10 changes from a circular opening 12, located above the spray boom 1, to an oval opening 14, located below the spray boom 1. The oval opening 14 at the lower portion of the tubular housing 10 is preferred as the oval shape tends to flatten and widen the discharge pattern of the airflow exiting from the opening 14 to provide for complete discharge overlap between spray units. In the preferred embodiment, the improved spray units are spaced on 40 inch centers across the spray boom 1 and the oval opening 14 is designed to overlap the fan shaped discharge of the spray units to provide a complete and efficient pesticide application.

Figure 5:
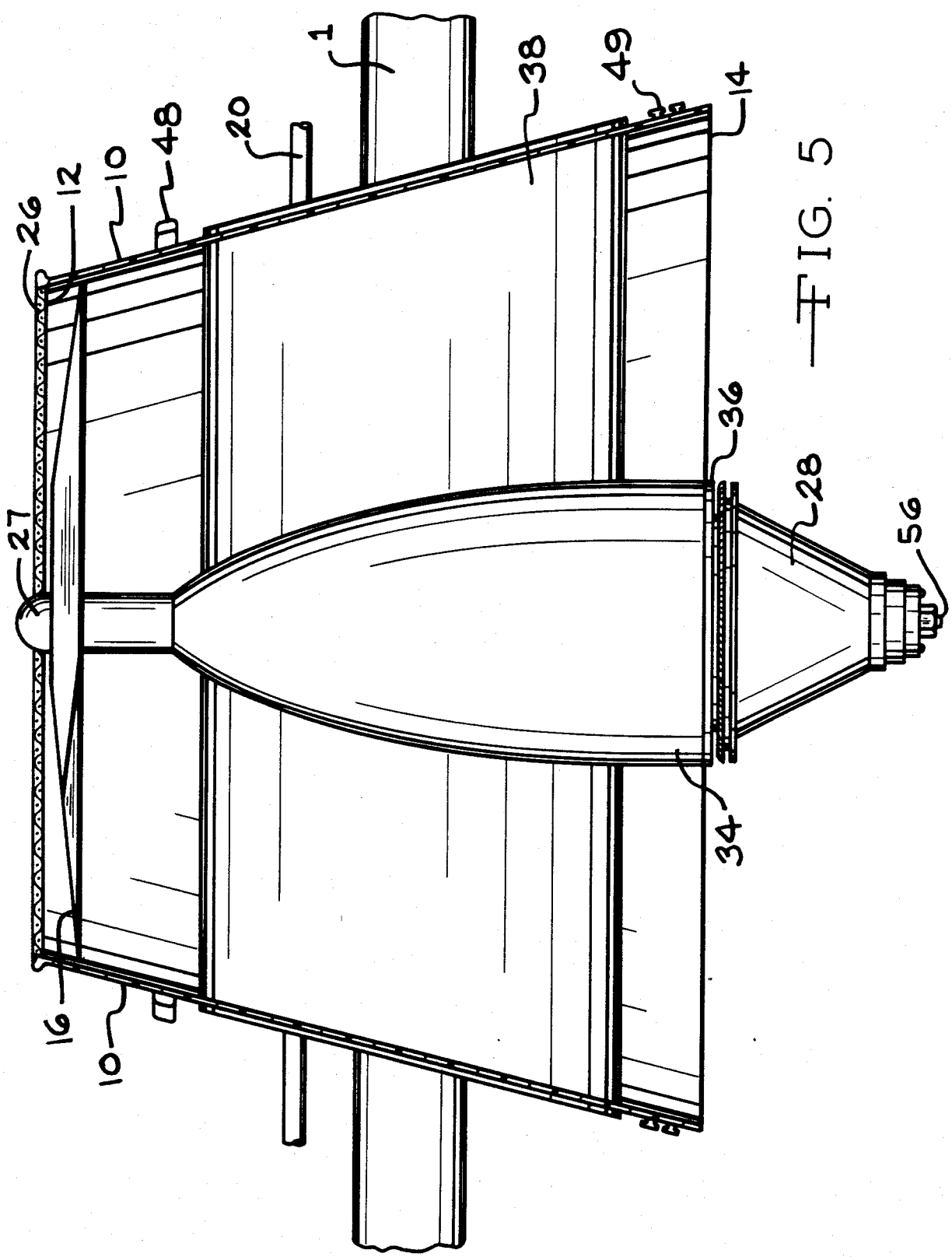
FIG. 5 is a cutaway view along line 5—5 of FIG. 4.
Figure 6:
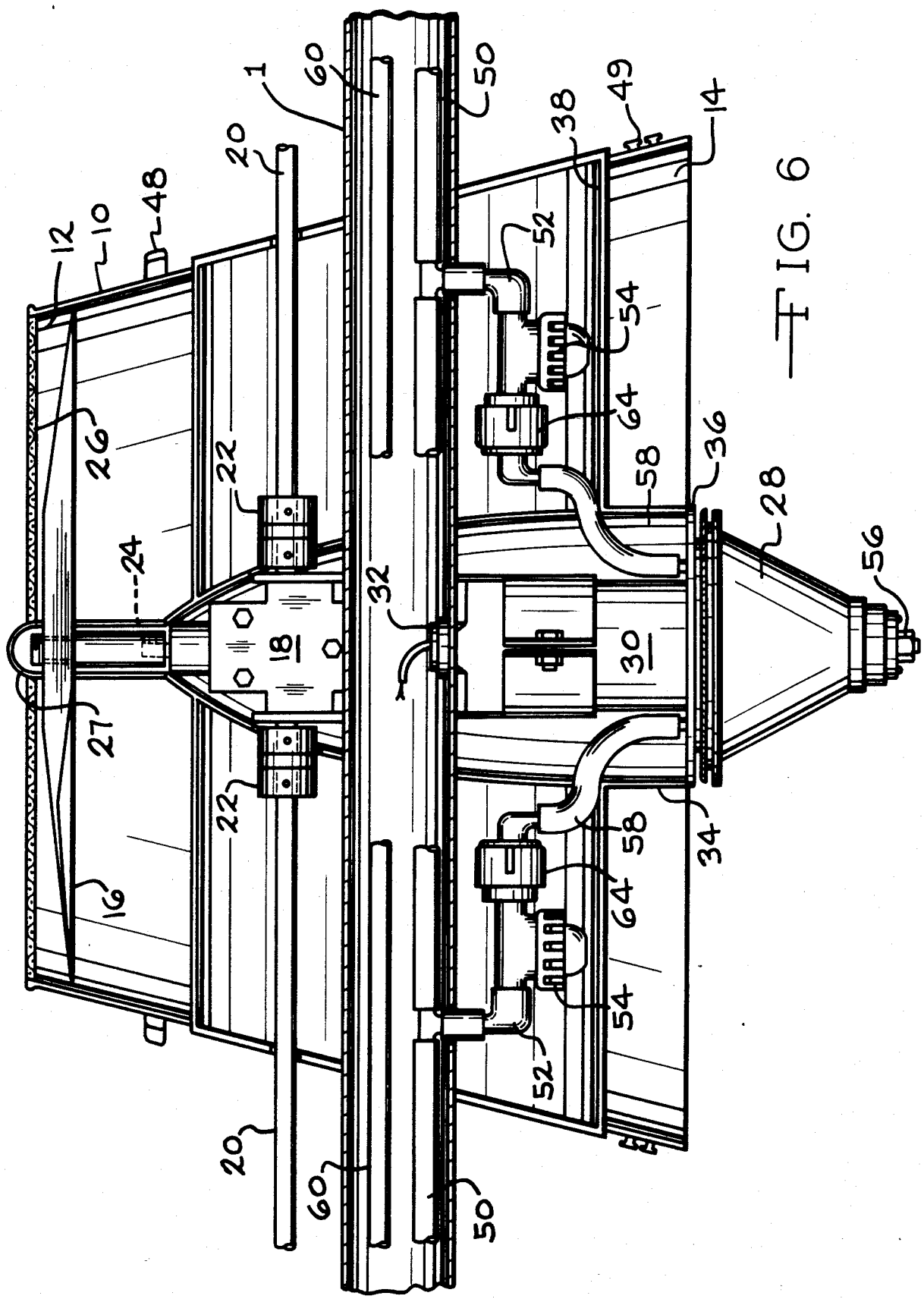
FIG. 6 is a cutaway view along line 6—6 of FIG. 4.

Referring now to FIGS. 5 and 6, a fan member 16 is housed within the tubular housing 10 at a location proximate the circular opening 12. The fan member is driven through a right angle gearbox 18, which in turn is mounted securely to the top side of the spray boom 1. In the preferred embodiment, the gearbox 18 is of aluminum construction and has a one horsepower minimum capacity.

The gearbox 18 receives its rotational force input through the driveshafts 20 which are connected to the gearbox by flexible couplers 22, such as lovejoy couplers. The couplers 22 compensate for any misalignment between the gearbox 18 and the driveshafts 20 and provide for the quick removal of the driveshafts 20 or gearbox 18 for servicing. The driveshafts 20 connect the spray units of a spray boom 1 section in series and are driven by a single conventional gear hydraulic motor 62. Thus, on a conventional sprayer there are three boom sections with each boom section including a series of improved pesticide spray units of the present invention spaced on 40 inch centers. The sprayers on each boom section are interconnected together by driveshafts 20 which, in turn, are connected to a single hydraulic motor 62 located on the boom section. Therefore, the sprayer will use three hydraulic motors; one for the left boom section, one for the center boom section, and one for the right boom section.

Figure 4:
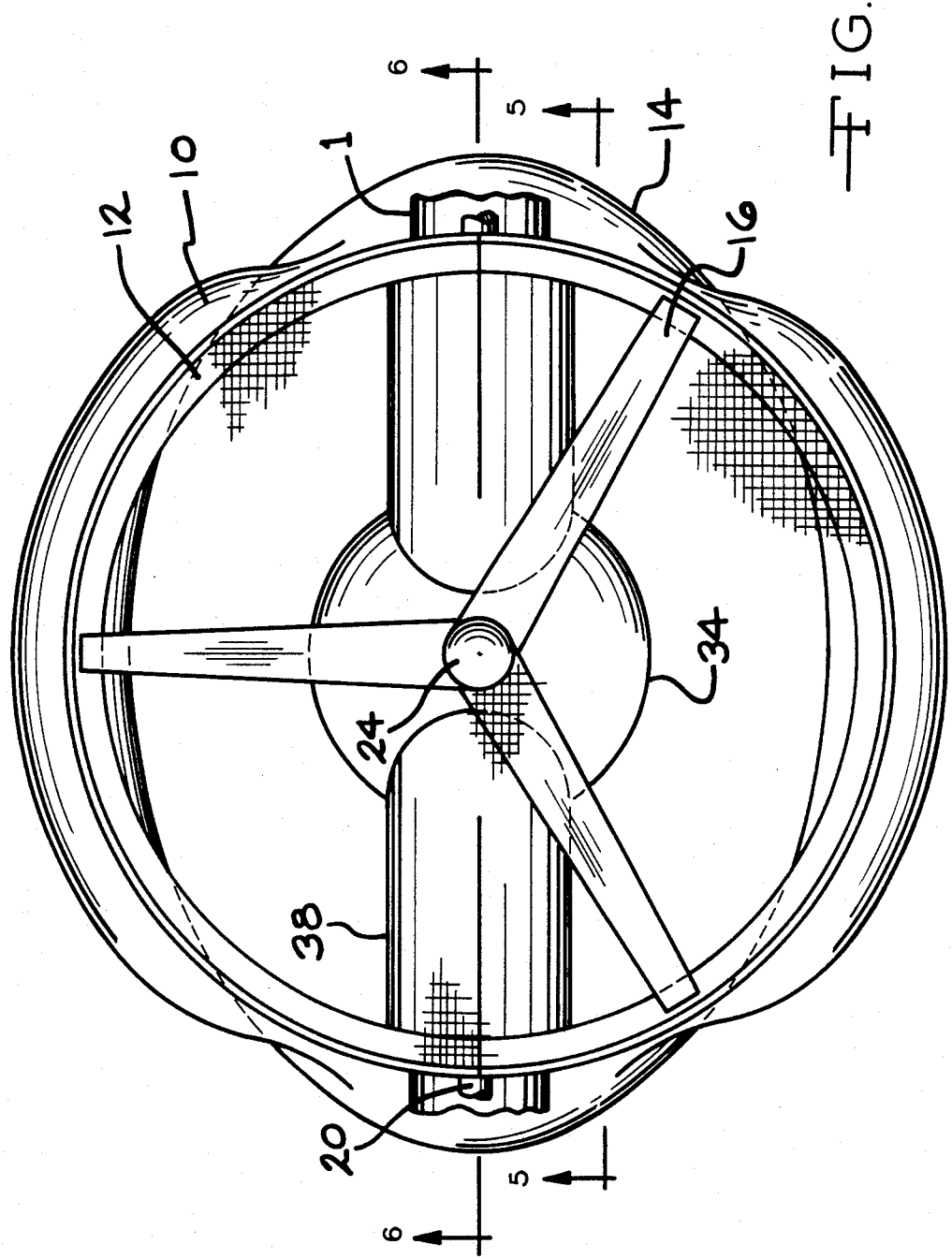
FIG. 4 is a top view of the pesticide spray apparatus of the present invention.

Referring now to FIGS. 4 and 6, the fan members 16 of the spray units are either three-bladed or five-bladed fans depending on the design applications and the volume of air needed for specific environmental conditions. The fan members 16 are mounted on the output shaft 24 of the right angle gearbox 18 and are reverse threaded against the direction of torque, thereby forcing the fan members 16 to self-tighten when the spray unit is in operation. A protective wire screen 26 is clipped across the circular opening 12 to prevent contact with the fan member 16 and to prevent the intrusion of unwanted objects into the tubular housing 10. An aerodynamic cap 27 is screwed on the shaft end above the fan member 16.

In the preferred embodiment, each fan member 16 requires from 1/10 to 1/5 horsepower at maximum RPM. The more blades on the fan member 16, the greater the torque demand. Therefore, depending on the number of pesticide spray units per boom member 1, the size of the hydraulic drive motor 62 can be scaled accordingly. The hydraulic drive motors 62 for each boom section, if the sprayer includes more than one boom section, are connected in series and, thus, all run at the same speed. Speed is controlled by a hydraulic flow control (not shown) which is connected to a 12-volt DC linear actuator (not shown). The linear actuator (not shown) receives its power from the tractor, truck or whatever prime mover is carrying the spray boom 1. The operator control (not shown) for the linear actuator (not shown) is mounted on the operator's platform or in the cab of the prime mover. Thus, the air volume moving through the blower unit can be controlled by increasing or decreasing the fan speed via the actuator's electrical control. It has been shown that the response time is dependent upon the actuator speed, and usually ranges from 10-15 seconds for a full cycle. In this manner, the operator can quickly and easily change the delivery velocity of the air as the field conditions require. There is no need for the operator to stop the spraying apparatus or dismount from the operator platform.

The pesticide droplet generation system operates independently of the air delivery system. This is desirable since the operators will often encounter field situations where droplet density must be varied irrespective of the air delivery speed. In the preferred embodiment, the pesticide applicator is a rotary atomizer 28 such as a Micron DR-4. The rotary atomizer 28 is mounted to the underside of the spray boom 1 and is located directly below the oval opening 14 of the tubular housing 10. A variable speed electric motor 30 is directly coupled to the shaft 56 of the rotary atomizer 28 to provide rotational power to the atomizer 28. In the preferred embodiment, the electric motor 30 is a 12-volt DC variable speed motor capable of an infinite number of speed settings from 0-6500 RPM. The electrical wiring 32 for the electric motor 30 is mounted inside the spray boom 1. The electrical wiring 32 runs through the interior of the spray boom 1 and connects with the prime mover and receives its power from the electrical system of the prime mover. Locating the electrical wiring harness inside the spray boom 1 protects the electrical wiring from the corrosive effects of the chemical pesticides being applied through the system. The electric motors 30 of each spray unit are connected in series, thus allowing for the rotational speed of all motors 30 of all spray units mounted on a boom section 1 to be varied and controlled by one motor speed control unit (not shown). The motor speed control unit (not shown) is mounted next to the control (not shown) for the linear actuator (not shown) on the operator's platform or in the cab of the prime mover. Since the rotary atomizer 28 is connected by a fixed shaft 56 to the variable speed electric motor 30, the atomizer rotational speed will be the same as the motor speed and the droplet density of the pesticide chemical can be altered quickly without need for discontinuing the spray application or dismounting from the cab. A unique aspect of the present invention provides for the independent controls for the rotational speed of the rotary atomizer 28 and the rotational speed of the fan member 16 to be independently varied, thereby providing any combination of high or low air volume coupled with high or low droplet density. This capability provides the operator with true control to manage all field conditions during the pesticide application process.

The present invention also provides a unique aerodynamic design for the tubular housing 10 and further provides for protective aerodynamic shrouds which cover and protect the interior components of the spray systems which are located inside the tubular housing 10. Referring now to FIGS. 2, 3 and 5, the aerodynamic shrouds will be described in detail. The center shroud member 34 is generally designed to enclose and cover the gearbox 18 and electric motor 30. In the preferred embodiment, the center shroud 34 is ½ of an ellipse with an eccentricity of 0.966. A bottom plate 36 is fixed to the center shroud 34 at a point located proximate the rotary atomizer 28. The center shroud 34 is aligned with the central axis of the spray unit, that axis being defined by the axis extending through the center of the output shaft 24 of the gearbox 18 and the shaft 56 of the rotary atomizer 28.

A boom shroud 38 is integrally connected to the center shroud 34 and extends across the width of the tubular housing 10 to cover and protect the spray boom 1, driveshafts 20 and other interior components. The boom shroud, in the preferred embodiment, is a complete ellipse with an eccentricity of 0.942. The boom shroud 38 is aligned with the centerline of the spray boom 1.

In the preferred embodiment, the center shroud 34 and the boom shroud 38 are integrally molded together and are formed in two sections; a right shroud section 40 and a left shroud section 42. The sections 40, 42 are adapted to fit around the spray boom 1 at their centerline.

Since the center shroud 34 and boom shroud 38 occupy volume within the tubular housing 10, the shape of the tubular housing 10 must aerodynamically conform to compensate for the variations in the cross-sectional surface area of the flow tunnel of the tubular housing in order to prevent any unnecessary turbulence in the airflow as it moves through the tubular housing. The present invention provides for substantially constant cross-sectional interior surface area on any lateral plane of reference within the tubular housing 10 from the circular opening 12 to the oval opening 14. If the same interior surface area is not maintained as the air column is driven through the tubular housing 10, zones of constriction and expansion will develop, causing high or low pressure turbulence. This turbulence is undesirable as it could destroy the droplet pattern produced by the rotary atomizer 28. Therefore, the shape of the tubular housing is designed to variably compensate for the shapes of the center shroud 34 and boom shroud 38 in the interior of the flow tunnel.

The tubular housing 10 is also divided into sections; a right housing member 44 and a left housing member 46. In the preferred embodiment, the right and left housing members 44, 46 engage the right and left shroud sections 40, 42 and operate to secure the shroud sections 40, 42 to the spray boom 1. The right housing member 44 and left housing member 46 are connected together with over-center latches 48 which are located proximate the top of the tubular housing 10 and with hook hinges 49 located proximate the bottom of the tubular housing 10. As the housing members 44, 46 are latched together, they engage and secure the shroud members 34, 38 to the spray boom 1. Thus, the entire aerodynamic blower unit is firmly secured to the spray boom 1 and will incur no vertical, horizontal, and lateral movement. The latches 48 and hook hinges 49 provide for easy removal of all shrouds from the boom 1. To remove the shroud members 34, 38 from the boom 1, the operator first removes the right housing member 44 and left housing member 46 from the spray boom 1, leaving the boom shroud 38 and center shroud 34 on the spray boom 1. The right shroud section 40 and left shroud section 42 are then removable from the spray boom 1, providing quick and easy access to all interior components. The shrouds 34, 38 act to protect all interior mechanical and electrical components of the spray system from unnecessary exposure to the elements and pesticides. Even if some infiltration occurs, the simple removal of all shrouds encourages routine cleaning.

Referring now to FIGS. 3 and 6, the pesticide flow control system will be described. Uniform pesticide droplet generation of the desired size is possible only if the rate of chemical flow to the rotary atomizer cup 28 remains constant. Since the present invention is designed for use in applying pesticides without need for a water carrier, there are distinct reduced pesticide flow requirements for achieving a proper application rate. In many situations only a few ounces of pesticide chemical per minute must flow to the rotary atomizer 28 to achieve acceptable chemical dispersion. This reduced flow requirement makes difficult the handling of such pesticides as wettable powders since those pesticides require constant agitation to avoid settling. For this reason, the chemical feed systems of the present invention are a closed loop or recirculating design. The supply lines 50 which are located on the interior of the spray boom 1 are designed to pass each rotary atomizer 28 and return lines 60 supply remaining chemical to the suction side of the chemical feed pump (not shown).

The supply lines 50 are engaged by atomizer supply lines 52 which extend through the spray boom 1 into anti-siphon assemblies 54. In the preferred embodiment, the anti-siphon assemblies 54 are Spraying Systems designation 18670. The anti-siphon assemblies 54 each include a filter and a rate control plate. The anti-siphon assemblies 54 are simple spring-loaded diaphragms that are set to open above 7 psi. When the pressure in the supply lines 50 of the pesticide feed systems exceeds the threshold 7 psi, chemical flows through the filter and the rate control plate orifice to the rotary atomizer 28. The feed tubes 58 to the rotary atomizer 28 are connected to the anti-siphon assembly 54 by means of a quick attach connector 64.

An operator controlled solenoid valve (not shown) located in the supply line 50 system controls the pesticide flow from the chemical feed pump (not shown). In the preferred embodiment, a check valve (not shown) is placed in the chemical return line 60 to prevent loss of system pressure after the solenoid closes. Further, the diaphragms located within the anti-siphon assembly 54 will seal as soon as the pressure in the supply system falls below 7 psi. Thus, the recirculating pesticide system will remain pressurized at this level until again placed in service, preventing air from entering the system and bringing a quicker response when energized.

In the preferred embodiment, there are two separate independent pesticide supply systems. Each is fed from its own pump and reservoir. The two systems allow pesticides that address different problems to be used together, such as broadleaf herbicides and grass herbicides. It also provides for the simultaneous application of chemicals that are totally incompatible in tank mixtures, as well as chemicals that require differing application rates.

Electrical control of each solenoid is obtained by means of a on/off switch positioned on the operator's platform proximate the control switches for the air delivery system and the pesticide atomizer speed. Thus, it can be seen that general area spraying as well as spot spraying is possible. The quick response of the pressurized manifold allows precise application, regardless of ground speed. Total control of the chemical application process is available to the operator, enabling the operator to adjust the application to meet varying environmental conditions without incurring time-loss and frustrating manual adjustments to the spraying unit.

The foregoing description of the present invention is intended to be illustrative in nature and is not intended to be limiting upon the scope and content of the following claims.

What I claim is:

1. An improved pesticide spray apparatus comprising, in combination: at least one rotary atomizing member fixed to a boom member, means for supplying such pesticide to said rotary atomizing member for dispersion, means for rotating said atomizing member, blower means for supplying a column of fluidized air, said blower means including a fan member spaced from and opposed to said rotary atomizing member, said blower means further including a housing member positioned on said boom member, said fan member being located within said housing member, said housing member being of hollow cross section and having open ends, said first open end of said housing member being substantially circular in cross section and said opposed open end of said housing member being generally oval in cross section with the long axis of said oval being parallel to the longitudinal axis of said boom member, said blower means further including a boom shroud member located within said housing member, said blower means further including a center shroud member located within said housing member between said fan member and said rotary atomizing member, whereby during operation of said spray apparatus said column of fluidized air is propelled by said fan member through said housing member and around said boom shroud and said center shroud to envelope said rotary atomizing member and assist in dispersing such pesticides exiting said rotary atomizing member.

2. The spray apparatus of claim 1, wherein said rotary atomizing member and said fan member are spaced apart and said fan member is positioned within one end of said housing member, said housing member extending from said fan member to a point proximate said rotary atomizing member whereby said rotary atomizing member is positioned adjacent said housing member.

3. The spray apparatus of claim 1, wherein said rotary atomizing member includes a cup member spaced from said boom member, a shaft member connected to said cup member and a motor means engaged with said shaft member to rotate said cup member.

4. The spray apparatus of claim 3 wherein said motor means is fixed to said boom member.

5. The spray apparatus of claim 3 further including at least one pesticide flow control means mounted on said boom member, said pesticide flow control means being in communication with said supply means for regulating the flow rate of such pesticide to said cup member.

6. The spray apparatus of claim 5, wherein said blower means includes means for driving said fan member.

7. The spray apparatus of claim 6, wherein means for driving said fan member includes a second motor means mounted on said boom member and a gearbox in communication with both said motor means and said fan member.

8. The spray apparatus of claim 7 further including a driveshaft interconnected between said second motor means and said gearbox.

9. The spray apparatus of claim 8, wherein said housing member encloses said fan member, said gearbox, a portion of said driveshaft, said first motor means and said pesticide flow control means.

10. The spray apparatus of claim 9, wherein said fan member is located proximate one open end of said housing member.

11. The spray apparatus of claim 10, wherein said cup member is located adjacent the opposed open end of said housing member outside of the cross-sectional plane of said opposed open end of said housing member.

12. The spray apparatus of claim 11, wherein said boom shroud member encases said portion of said boom member and said portion of said driveshaft located within said housing member.

13. The spray apparatus of claim 12, wherein said boom shroud member is generally elliptical in cross-section with the long axis of said ellipse being perpendicular to the longitudinal axis of said boom member and extending in a direction parallel to the longitudinal centerline of said housing member.

14. The spray apparatus of claim 13, wherein said center shroud member encases said gearbox and said first motor means.

15. The spray apparatus of claim 14, wherein said center shroud member is generally elliptical in cross-section with the long axis of said ellipse located at the longitudinal centerline of said housing member and the short axis of said ellipse is located at a point immediately adjacent said cup member, whereby said center shroud terminates in a base which is located at a point proximate the short axis of said ellipse.

16. The spray apparatus of claim 15 wherein the longitudinal cross section of said housing member varies along said longitudinal axis of said housing member from said circular first opening to said oval opposed opening, such variation in cross section being substantially equivalent to the corresponding interior cross section of said boom shroud and said center shroud at such points along said longitudinal axis of said housing member, whereby such correlative variations in such cross section of said housing member produces a substantially constant pressure to such air column through said housing member and around said center shroud and said boom shroud.

18. An improved spray apparatus comprising, in combination: at least one spraying member, blower means for supplying a column of fluidized air, said blower means including a fan member spaced from and opposed to said spraying member, said blower means further including a housing member positioned adjacent said spraying member, said fan member being located within said housing member, said housing member being of hollow cross section and having open ends, said first open end of said housing member being substantially circular in cross section and said opposed open end of said housing member being generally oval in cross section, said blower means further including a center shroud member located within said housing member between said fan member and said rotary atomizing member, wherein the longitudinal cross section of said housing member varies along said longitudinal axis of said housing member from said circular first opening to said oval opposed opening, such variation in cross section being substantially equivalent to the corresponding interior cross section of said center shroud at such points along said longitudinal axis of said housing member, wherein said correlative variations in such cross section of said housing member produces a substantially constant pressure to such air column through said housing member and around said center shroud, whereby during operation of said spray apparatus said column of fluidized air is propelled by said fan member through said housing member and around said center shroud to envelope said spraying member and assist in dispersing such material exiting said spraying member.

17. An improved spray apparatus comprising, in combination: at least one spraying member, blower means for supplying a column of fluidized air, said blower means including a fan member spaced from and opposed to said spraying member, said blower means further including a housing member positioned adjacent said spraying member, said housing member being of hollow cross section and having open ends, said first open end of said housing member being substantially circular in cross section and said opposed open end of said housing member being generally oval in cross section, said blower means further including a center shroud member located within said housing member between said fan member and said spraying member, whereby during operation of said spray apparatus said column of fluidized air is propelled by said fan member through said housing member and around said center shroud to envelope said spraying member and assist is dispersing such material exiting said spraying member.

* * * * *